(12) United States Patent
Smith et al.

(10) Patent No.: US 8,867,921 B2
(45) Date of Patent: Oct. 21, 2014

(54) OPTICAL COMMUNICATIONS IN AMPLIFIED RECIPROCAL NETWORKS

(75) Inventors: David F. Smith, Ellicott City, MD (US); Anis Husan, San Diego, CA (US)

(73) Assignee: Ziva Corporation, San Diego, CA (US)

( * ) Notice: Subject to any disclaimer, the term of this patent is extended or adjusted under 35 U.S.C. 154(b) by 656 days.

(21) Appl. No.: 13/119,902

(22) PCT Filed: Sep. 29, 2009

(86) PCT No.: PCT/US2009/058800
§ 371 (c)(1),
(2), (4) Date: Jun. 7, 2011

(87) PCT Pub. No.: WO2010/074782
PCT Pub. Date: Jul. 1, 2010

(65) Prior Publication Data
US 2011/0229145 A1    Sep. 22, 2011

Related U.S. Application Data

(60) Provisional application No. 61/101,977, filed on Oct. 1, 2008.

(51) Int. Cl.
*H04B 10/00* (2013.01)
*H04B 10/293* (2013.01)

(52) U.S. Cl.
CPC ............................ *H04B 10/2935* (2013.01)
USPC .......................... 398/136; 398/138; 398/169

(58) Field of Classification Search
USPC .......... 398/136–138, 150–151, 164, 169–170
See application file for complete search history.

(56) References Cited

U.S. PATENT DOCUMENTS

| | | | |
|---|---|---|---|
| 7,346,280 B1 | 3/2008 | Sguazzotti et al. | |
| 7,796,896 B2 * | 9/2010 | Sikora et al. | 398/170 |
| 8,233,792 B2 * | 7/2012 | Gilbert et al. | 398/16 |
| 2001/0038478 A1 | 11/2001 | Hwang | |
| 2003/0117692 A1 * | 6/2003 | Tanaka et al. | 359/334 |
| 2005/0036787 A1 | 2/2005 | Lee et al. | |
| 2005/0047785 A1 | 3/2005 | Hwang et al. | |
| 2006/0188267 A1 * | 8/2006 | Gavrilovic et al. | 398/188 |
| 2008/0089692 A1 * | 4/2008 | Sorin | 398/135 |

FOREIGN PATENT DOCUMENTS

| | | |
|---|---|---|
| JP | 2001-324654 A | 11/2001 |
| JP | 2006-211308 A | 8/2006 |

OTHER PUBLICATIONS

International Search Report and Written Opinion mailed on Jun. 28, 2010 for International Application No. PCT/US2009/058800, filed Sep. 29, 2009 (7 pages).

* cited by examiner

*Primary Examiner* — Dzung Tran
(74) *Attorney, Agent, or Firm* — Perkins Coie LLP

(57) ABSTRACT

Techniques, apparatus and systems to provide carrier signal transmission in reciprocal transmission architecture networks for optical communications.

26 Claims, 13 Drawing Sheets

OPTICAL COMMUNICATIONS IN AMPLIFIED RECIPROCAL NETWORKS

This application claims the priority of U.S. Provisional Patent Application No. 61/101,977 entitled "OPTICAL COMMUNICATIONS IN AMPLIFIED RECIPROCAL NETWORKS" and filed Oct. 1, 2008, the entire contents of which are incorporated by reference as part of the specification of this application.

FEDERALLY SPONSORED RESEARCH OR DEVELOPMENT

This invention was made with government support under Contract No. W911NF-07-1-0086 awarded by DARPA. The government has certain rights in the invention.

BACKGROUND

This document relates to optical communication techniques, apparatus and systems.

Optical communications use light that is modulated to carry data or other information and can be used for a variety of applications. Examples include long-haul telecommunication systems on land or under the ocean to carry digitized signals over long distances. Optical communications are also used for connections to internet service providers or to carry cable television signals between field receivers and control facilities. Also, optical communications are used for signal distribution from telephone switching centers to distribution nodes in residential neighborhoods.

SUMMARY

The techniques, apparatus and systems described in this document can be used to provide carrier signal transmission in reciprocal transmission architecture networks for optical communications.

In one aspect, an optical communication system includes a first optical communication node to output a first optical signal. The system also includes a second optical communication node to receive the first optical signal and to generate from the first optical signal a second optical signal for transmission to the first optical communication module. The system further contains a single optical link connected between the first and second optical modules to guide the first and the second optical signals in the same optical path provided by the single optical link, the same optical path provided by the single optical link exhibiting backward Rayleigh scattering to produce Rayleigh scattering noise in response to signal light in a direction opposite to the signal light at each location along the optical path. The system also includes one or more optical amplifiers located in the single optical link between the first and second optical modules at locations selected based on Rayleigh scattering noise received by the first optical module in detecting the second optical signal to minimize the Rayleigh scattering noise.

In another aspect, a system for optical communications can include a first optical communication module to output a first optical signal. The system also includes an optical link optically coupled to the first optical communication module to receive and transmit the first optical signal. The system further includes a second optical communication module optically coupled to the fiber to reflect the first optical signal back into the link towards the first optical communication module as a second optical signal to be received by the first optical communication module. The system also includes at least one optical amplifier coupled between the first and second communication modules to amplify the second optical signal to maintain, at least on average, a power level for the second optical signal equal to the power level of the first optical signal.

In yet another aspect, a method including emitting a carrier signal from a station A. The method further includes transmitting the emitted carrier signal to a station B through an optical transmission line. Next, passing the outbound carrier signal through at least one optical amplifier integrated in the transmission line. The method includes reflecting the passed carrier signal at station B and transmitting the reflected carrier signal to station A through the optical transmission line. Next, the method describes amplifying the inbound carrier signal through the at least one optical amplifier integrated into the transmission line. The method includes receiving the transmitted carrier signal at station A. The optical amplifier is configured to maintain, at least on average, a power level for the inbound carrier signal equal to the power level of the outbound signal.

DETAILED DESCRIPTION

The techniques, apparatus and systems described in this document are based on reciprocal transmission architecture (RTA) of optical communication networks. In an RTA link system a carrier signal is sent from a sending station to a remote network station. The remote station modulates information onto the carrier and reflects the carrier back to the sending station along the same path. The techniques, apparatus and systems described in this document can be implemented in ways to enhance reception of the modulated carrier signal returning at the sending station against various effects that can adversely affect and complicate the reception and detection at the sending station.

Figure 1:
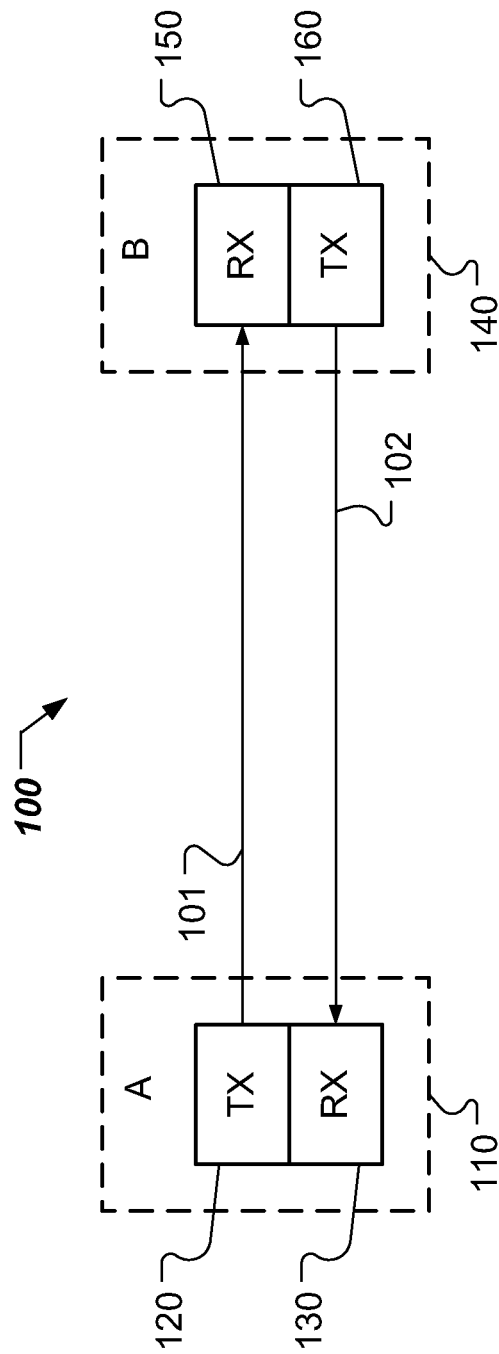
FIG. 1 shows a schematic of transmission in an optical communication link.

Most optical communication networks use fiber optic lines for transmission of optical signals between network nodes. An example of an optical communication link is illustrated schematically in FIG. 1 and includes two optical communication modules. Station A 110 has a transceiver that includes a transmitter TX 120 and a receiver RX 130. Station B 140 is in communication with station A 110 through optical transmission lines 101 and 102. Station B 140 also is equipped with a transmitter TX 160 and a receiver RX 150. The TX 120 at station A 110 encodes a data stream into a carrier signal and transmits a first encoded signal to station B 140 via the optical transmission line 101. The RX 150 at station B 140 receives the first encoded signal transmitted from station A 110. In response to the received encoded signal, the TX 160 at station B 140 encodes another data stream to another carrier signal and transmits a second encoded signal to station A 110 via the optical transmission line 102. The RX 130 at station A 110 receives the second encoded signal transmitted from station B 140. Thus, for the network link 100, bidirectional communication between stations A 110 and B 140 is accomplished through two transmission lines 101 and 102.

In the communication link 100 a sender of the first encoded signal does not know if the link is fully operational and optimized before the message is sent out. Furthermore, the sender at station A 110 does not know prior to sending the first encoded signal whether an intended recipient or an unauthorized recipient may receive at station B 140 the transmitted first encoded signal. Information on link integrity and security is important for various communication applications including mission critical real-time military applications.

Figure 2:
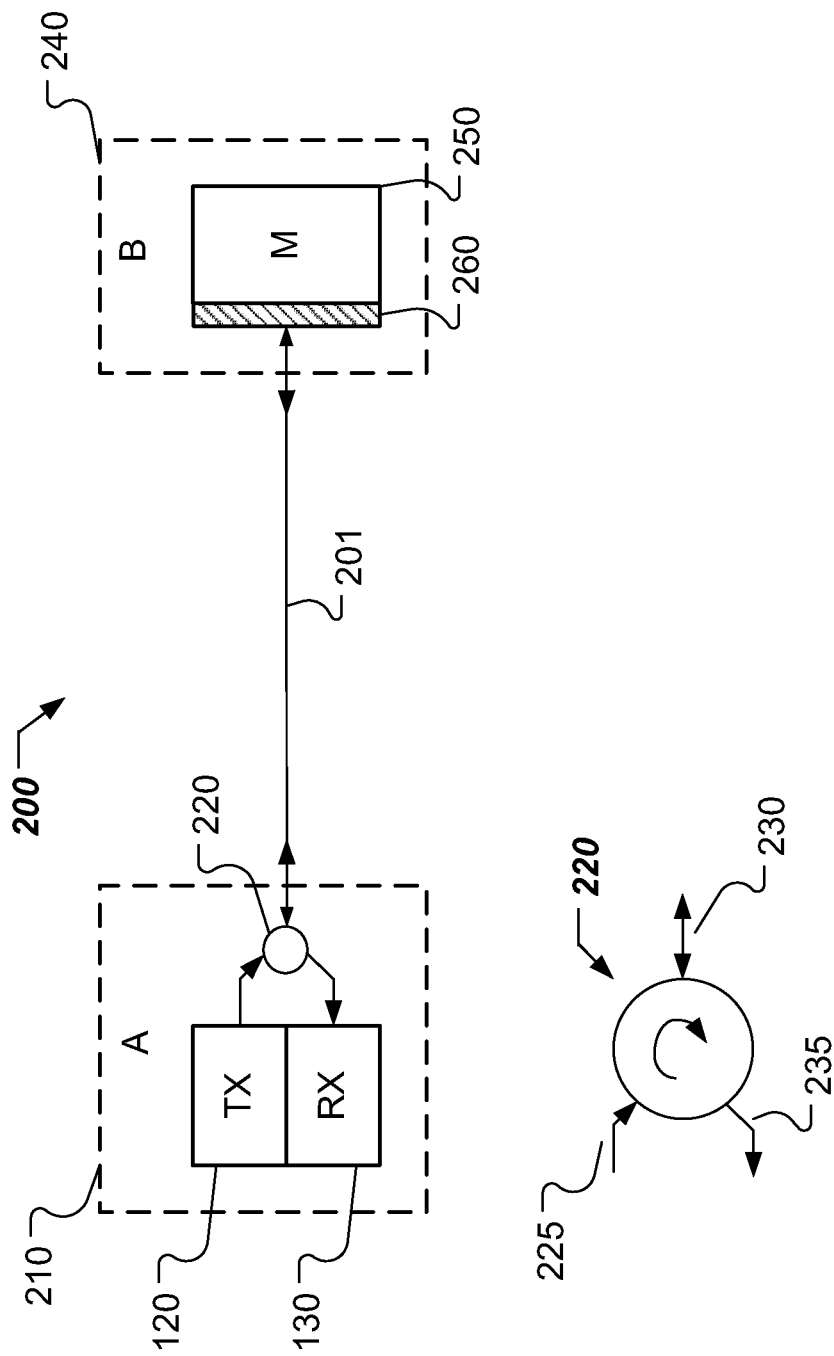
FIG. 2 shows a schematic of transmission in a reciprocal transmission architecture (RTA) link.

FIG. 2 shows an example of one direction of an RTA link system 200 which has two communication modules linked by a single optical path link that transmits light between two modules in the same path. This design can be configured to satisfy the signal integrity and security requirements enumerated above. Notably, the outgoing and return paths are identical or nearly identical, and thus station A may send out a known signal which is reflected in a prearranged manner by station B and returns to station A along the identical fiber path that it used for the upstream direction. Since station A knows exactly the transmitted signal, station A is uniquely positioned to infer and correct for network path degradations based on the returning signal.

The methods and systems disclosed in this document enable a user located at station A to determine if the RTA link system is fully operational and optimized before a first encoded signal is sent out from station B to station A, when an operator at station B applies an information bearing modulation to the reflected signal before it returns to station A. Furthermore, the operator at station A can determine that the transmission through the RTA link system has reached destination. Therefore, the operator at station A can optimize the signal for allowing station B to apply data and for ensuring error free performance when the optical carrier returns to station A. Disruptions can be very quickly flagged to the operator of station A. Moreover, station B can now communicate with confidence through a controlled link since station B can infer from the presence of a carrier that station A is receiving a good signal. The RTA link architecture closes the loop of knowledge regarding the integrity of the link and provides both station A and station B with information regarding the link quality that neither node could achieve from other optical communications architectures.

As an example, the RTA link system in FIG. 2 can include a station A 210 that communicates with station B 240 through a transmission line 201. Station A 210 includes a transmitter TX 120, a receiver RX 130 and an optical coupler 220. The optical coupler 220 is a non-reciprocal multi-port element. The TX 120 is coupled to an input 225 of the optical coupler 220. The RX 130 is coupled to an output 235 of the optical coupler 220. The third terminal 230 of the optical coupler 220 is coupled to the optical transmission line 201. Terminal 230 of the optical coupler 220 represents an input-output port of station A 210. The optical coupler 220 is operated as a circulator which allows power to pass from terminal 225 to terminal 230, and from terminal 230 to terminal 235. A non-operational open path is from perhaps from terminal 235 to terminal 225. All other paths associated to the optical coupler 220 are blocked.

Station B 240 includes a reflector 260 and a modulator 250. The reflector 260 is coupled to the optical transmission line 201 and represents the input-output port of station B. The reflector is also coupled to a modulator 250 which modulates the reflected light to superimpose information or data onto the reflected light.

The operation of the RTA link system 200 is described below. In its simplest implementation, a continuous wave (CW) carrier signal is emitted by the TX 120. The carrier signal emitted by the TX 120 is sent to the optical coupler 220 through the input 225. The carrier signal enters the optical transmission line 201 through the input-output port 230. The transmitted carrier signal reaches station B 240 where the light is reflected by the reflector 260 back into the transmission line 201. During the reflection process the modulator 250 can imprint a data stream onto the reflected light. The information encoded into the data stream may include the id of station B, id of an operator at station B, the power level of the received signal, etc. The modulator 250 may also rewrite data already coded onto the stream. For example, a possible modulation scheme takes a 1 arriving and sends a 1 out, takes a 1 arriving and sends a 0, takes a 0 arriving and sends a 0, takes a 0 arriving and sends a 1.

The encoded carrier signal reflected by station B 240 travels through the transmission line 201 and returns to station A 210 through the input-output port 230 of the optical coupler 220. The returning signal is routed to the RX 130 via the output port 235 of the optical coupler 220.

The operator of station A 210 can now decode the information encoded in the returning carrier signal. The signal received at station A 210 has the form $s(t)*h(t)*h(t)$, where $s(t)$ is the signal generated at station B 240, and $h(t)$ is the one way impulse response of the communication channel. The symbol * denotes convolution. The operator of station A 210 can deconvolve the signal $s(t)$ by first calculating the IFFT ($\sqrt{FFT(h(t)*h(t))}$). FFT and IFFT are respectively, the fast-Fourier transform and the inverse fast-Fourier transform. Thus, the operator of station A 210 can first obtain the impulse response $h(t)$, and then use it to deconvolve the data stream. Therefore, with respect to transmission integrity, the verification of link establishment is at the physical level under full control of the sender at station A. The RTA link system 200 has characteristic properties which are known only to the system operator. Therefore, the RTA link system 200 can be used for applications where highly secure communications are needed.

The RTA link system 200 can be subject to various types of noise sources that can diminish the reception quality of the RX 130 at station A 210. To quantify the reception quality an optical signal-to-noise ratio (OSNR) is introduced. By definition the OSNR at a certain location is defined as the ratio of the optical signal power $\langle I_S \rangle$ to the optical noise power $\langle I_N \rangle$, both detected at that location.

$$OSNR = \frac{\langle I_S \rangle}{\langle I_N \rangle} \qquad (1)$$

For the RTA link system 200 it is of interest to evaluate the OSNR at the input-output port 230 of station A 210. A large value of OSNR at the input-output port 230 of station A 210 is obtained when the detected signal in the numerator is large, and the detected noise in the denominator is small. For the returning signal to be large, the losses in the transmission line have to be small. Also, for the detected noise to be small the contributions of the various types of noise have to be eliminated. If elimination of a noise source is not possible, the operator of the RTA link system 200 has to mitigate the effect of that noise.

Figure 3:
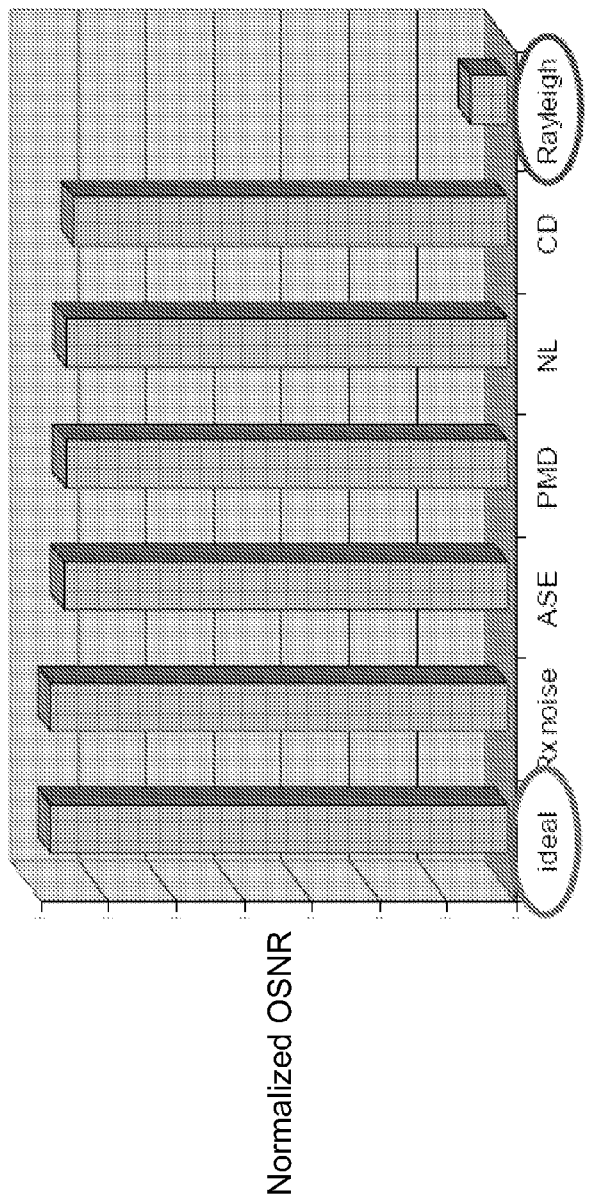
FIG. 3 shows relative magnitude of multiple loss sources for an RTA transmission link.

FIG. 3 illustrates a simulated signal OSNR at station A 210 for a 100 km long RTA link system 200. Several categories of distortion occurring in an optical fiber based communication link, such as receiver noise, amplified spontaneous emission, polarization mode dispersion, fiber nonlinearities and chromatic dispersion, are represented on the x-axis. The y-axis represents the OSNR corresponding to the noise categories represented in the x-axis. Each bar of the graph represents an OSNR calculated for one noise category at a time, according to EQ. 1. Moreover, the OSNR value for each noise category is normalized to the OSNR value of the first bar. The first bar represents an ideal link without losses and thermal noise at the RX 130.

Each type of noise occurring in the RTA link system 200 reduces the OSNR at the input-output port 230 of station A 210. FIG. 3 shows that the coherent Rayleigh backscattering reduces the OSNR much more compared to the other categories of noise, showing that Rayleigh backscattering dominates performance in RTA link systems. Notably, Rayleigh backscattering is an optical noise source created by the upstream signal that co-propagates with the downstream returning signal at the same wavelength as the upstream signal. Further simulations show that the maximal reach of a simple bidirectional link subjected to Rayleigh backscatter is ~50 km. At this distance the bit error rate (BER) rises to $10^{-3}$ which is the maximal BER that can be handled by most forward error correction (FEC) codes to achieve errorless transmission.

Such severe performance degradation of a communication link is considered insurmountable in most fiber-based communication systems for which the amplifier huts are being spaced at 70 km-120 km. Conventional reasoning holds that once OSNR is lowered under an usable level, it is impossible to regain the OSNR by inserting an amplifier in a link at a distance >50 km. However, the techniques and systems described in this application show that in bidirectional links the signal can be selectively amplified without amplifying the original Rayleigh backscatter. In the process of amplifying the signal, new Rayleigh backscatter may be generated, but, advantageously, the noise sources only add whereas the signal level increases multiplicatively.

The following sections of this document describe how Rayleigh backscatter interacts with signals transmitted in RTA link systems. Rayleigh backscatter is an intrinsic property of light propagating in optical fibers. Therefore Rayleigh backscattering noise is always present in RTA link systems.

This document presents systems and methods for configuring RTA link systems to mitigate the effects of Rayleigh backscattering.

Figure 4A:
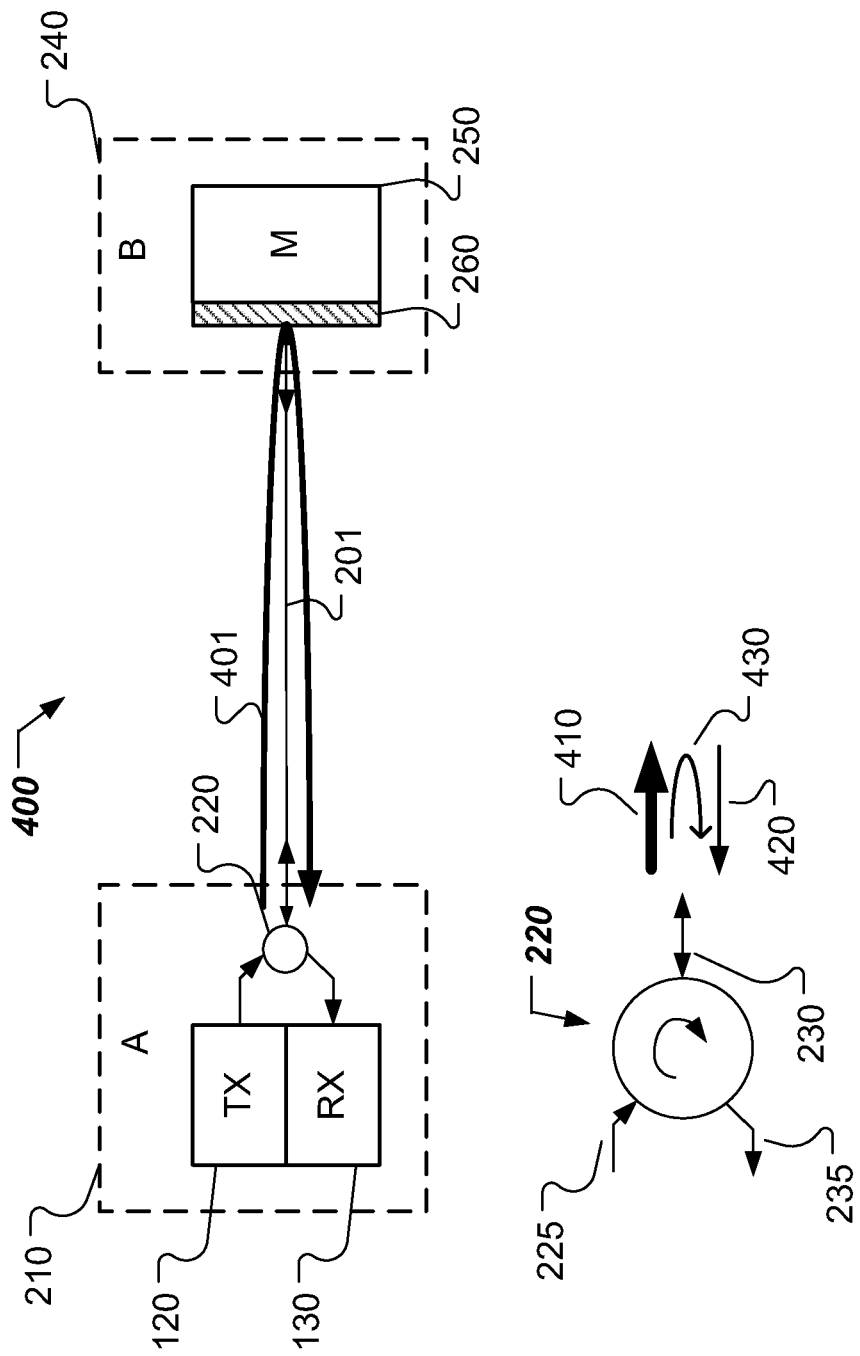
FIG. 4(a) shows another schematic of transmission in an RTA link system based on CW carrier signals.

The RTA link system 400 shown in FIG. 4(a) is used to quantify the effect of the Rayleigh backscattering noise at the input-output port 230 of station A 210. For example, a CW carrier signal 401 having an initial power level denoted $I_0$ is emitted by station A 210. The initial power level $I_0$ is depicted in the inset of FIG. 4(a) by a thick arrow 410 pointing away from the input-output port 230. The carrier signal 401 is transmitted through the transmission line 201 to station B 240. The distance from station A 210 to station B 240 is denoted D. A loss fraction is denoted L and corresponds to the fraction of the initial carrier signal power $I_0$ transmitted over the distance D. For example, a small L<<1 corresponds to a small fraction of the initial carrier signal power being transmitted over the distance D. In contrast, a large L<=1 (less then but almost equal to 1) corresponds to a large fraction of the initial carrier signal power being transmitted over the distance D. Additionally, in optical fiber transmission lines the loss fraction L is inversely proportional to the distance D traveled through the transmission line. For example, a small fraction L of a signal is transmitted over a large distance D, while a large fraction L of a signal is transmitted over a short distance D.

The carrier signal can be modulated at station B 240 by modulator 250. The modulation amplitude duty cycle fraction is denoted μ. For example, μ=0.5 corresponds to a 50% amplitude modulation duty cycle. A modulation fraction μ=1 corresponds to the case when station B 240 does not modulate the reflected carrier signal or modulates with a constant amplitude scheme like phase modulation. The modulated carrier signal returns to station A 210 through the transmission line 201. The power of the carrier signal returning to station A 210 is given by $$\langle I_s \rangle = \mu I_0 L^2 \qquad (2)$$

The initial signal power $I_0$ is multiplied twice by L, once for each of the two trips traveled from station A 210 to station B 240 and back to station A 210. The fraction μ accounts for the reduction of signal power due to the presence of modulation. Note that in EQ. 2 the losses are accounted for in multiplicative manner. The power of the carrier signal returning to station A 210 is depicted in the inset of FIG. 4(a) by a thin arrow 420 pointing towards the input-output port 230. The power of the carrier signal returning to station A, given by EQ. 2, represents the numerator of the OSNR formula in EQ. 1.

The reason for choosing the OSNR as the metric for assessing the system impact of co-propagating optical noise sources like Rayleigh backscattering is discussed below. Other noise sources of an electrical origin, for example receiver thermal noise, are added to the receiver noise in a manner that is independent of the received optical signal. Therefore, in the case of thermal noise, the signal-to-noise ratio at the receiver can be increased by increasing the optical power emitted at the source or by amplifying the transmitting optical signal. However, noise sources that are actually created by the optical signal itself, like Rayleigh backscattering noise, cannot be handled independently of the optical signal. In the case of Rayleigh backscattering noise, increasing or attenuating the optical signal power increases, respectively attenuates, the level of backscatter by the same fraction, and hence leaves the OSNR unaffected. Therefore, the limiting OSNR of Rayleigh backscattering can always be evaluated for an optical signal propagating in an RTA system by measuring the OSNR at the point where the leading edge of the returning optical signal passes it own trailing edge which is still moving upstream.

For example, for an RTA system which has no amplifiers, the leading edge of the signal by definition experiences the maximum path attenuation and the trailing edge by definition has the minimum attenuation. Since the configuration of an RTA system is such that the leading edge of a signal is able to encounter its own trailing edge in the same fiber, then this encounter determines the limiting OSNR (assuming no other optical noise source dominates). In the case of a CW signal in an RTA link system 400, the leading edge of a signal encounters its own trailing edge at the point where the reflected signal returns to the receiver. In an RTA link system 400, this represents the point in the system where the signal is at its lowest level due to fiber attenuation, and the Rayleigh backscattering noise is at its highest level being generated by the signal which has just been emitted.

Note that the point which determines OSNR is not exactly at the point where the leading edge of a signal encounters its own trailing edge, because the signal has to travel about 10 km into the fiber before creating the maximum Rayleigh return. However, this effect is a second order correction for most systems unless they are very short. If the fibers are very short, the aforementioned effect can be accounted for by multiplying the noise term by a factor $[1-(L_c)^2]$, where Lc is a critical length, say 10 km. This correction is neglected for the remainder of this application.

Returning to the RTA link system 400 in FIG. 4(a), the carrier signal reflected at station B 240 is limited by its own Rayleigh backscatter. The carrier signal after reflection will combine with the backscatter from the portion of the carrier signal still propagating towards station B. Therefore, the Rayleigh backscattering noise in the transmission line 201 is significant at points on the transmission line 201 where the leading end of the carrier signal catches up with the trailing end of the carrier signal after reflection at station B 240. For a CW carrier signal 401 in the RTA link system 400, the largest Rayleigh backscattering noise occurs at the input-output port 230 of station A 210. The power of the Rayleigh backscattering noise is denoted $I_B$. The strength of the Rayleigh backscatter is expressed in terms of a fraction denoted $S_R$. Therefore the power of the Rayleigh backscattering noise detected at the input-output port 230 of station A 210 is expressed as $$\langle I_B \rangle = S_R I_0. \quad (3)$$

The fraction $S_R$ depends on the material properties of the transmission line 201 and is independent of location on the transmission line (distance from station A 210), except closer to the end of the line, when the remaining length of fiber drops below ~10-15 km. Near the end of the line the amount of Rayleigh backscatter decreases since there is no longer enough fiber to sustain the Rayleigh backscatter. The power of the Rayleigh backscattering noise detected at the input-output port 230 of station A 210 is depicted in the inset of FIG. 4(a) by a reverse-C shaped arrow 430 pointing towards the input-output port 230. The quantity given by EQ. 3 represents the denominator of the OSNR formula in EQ. 1.

Figure 4B:
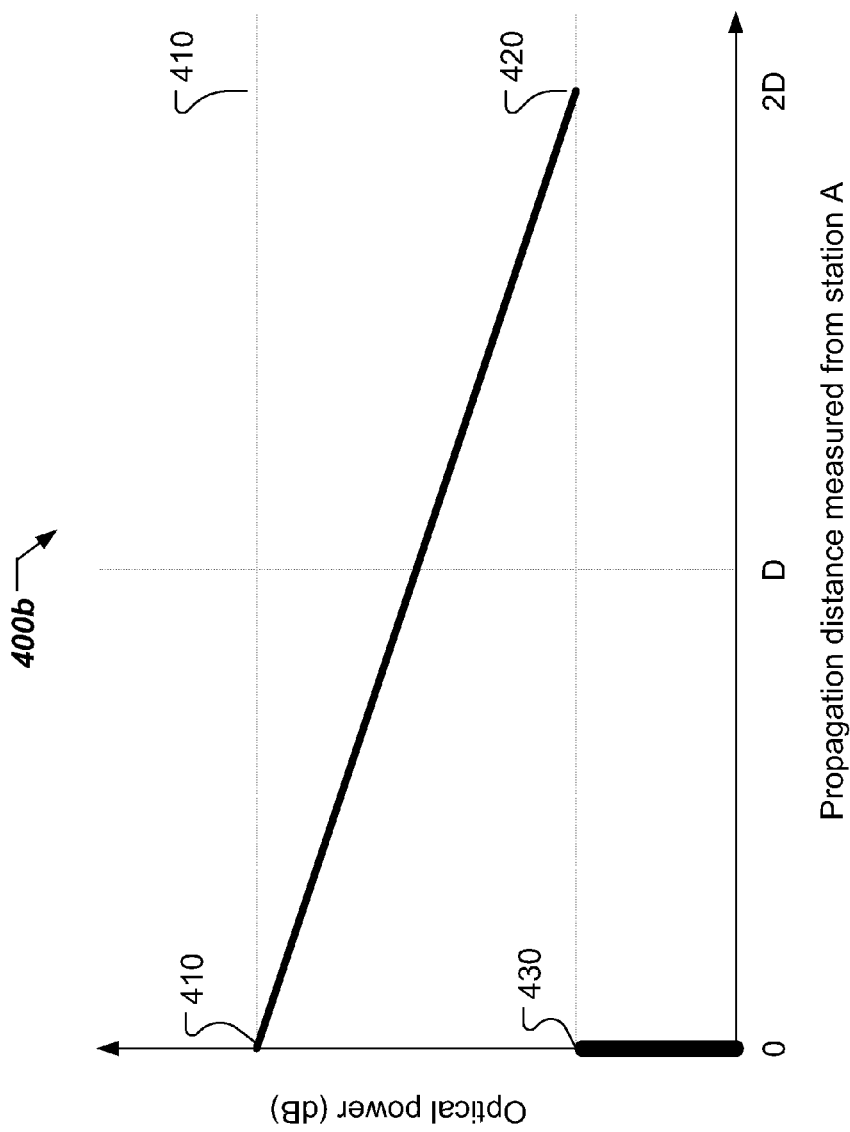
FIG. 4(b) shows optical power of the carrier signal and Rayleigh backscattering noise vs. propagation distance in an RTA link system.

The composite line-and-bar graph in FIG. 4(b) represents the optical power in the RTA link system 400 of the carrier signal (continuous line) and the Rayleigh backscattering noise (vertical bar) versus the propagation distance (l). The initial power level $I_0$, depicted in the inset of FIG. 4(a) by arrow 410, is represented in FIG. 4(b) by an optical power level 410 corresponding to a zero propagation distance (l=0). The power of the carrier signal returning to station A 210, depicted in the inset of FIG. 4(a) by arrow 420, is represented in FIG. 4(b) by an optical power level 420 corresponding to a round-trip (l=2D) propagation distance. The losses experienced by the carrier signal 401 during the round trip propagation from station A 210 to station B 240 can lead to a considerable decrease in the power level 420 of the returning signal compared to the power level 410 of the departing signal. The decrease in power from 410 to 420 corresponds to the multiplicative factor $L^2$ in EQ. 2. In the exemplary configuration 400b the modulation amplitude duty cycle fraction is set to $\mu=1$ (no discontinuity in the power level at l=D). The power of the Rayleigh backscattering noise detected at the input-output port 230 of station A 210, depicted in the inset of FIG. 4(a) by arrow 430, is represented in FIG. 4(b) by an optical power level 430 corresponding to the vertical bar at the origin of the graph (l=0).

By combining equations (1)-(3), the OSNR at the input-output port 230 of station A 210 is given by $$OSNR = \frac{\langle I_S \rangle}{\langle I_B \rangle} = \frac{\mu I_0 L^2}{S_R I_0} = \frac{L^2}{S_R}. \quad (4)$$

In this example, the modulation amplitude duty cycle fraction in EQ. 4 is 1 corresponding to no amplitude modulation of the reflected carrier signal.

EQ. 4 predicts that in the RTA link system 400 the OSNR at the input-output port 230 of station A 210 is small. A large Rayeigh backscattering noise contribution 430 is contained in the denominator of the OSNR. The Rayleigh backscattering noise 430 is large because the Rayleigh backscattering occurs at station A 210 where the carrier signal power 410 is largest (see EQ. 3). The power contributed by the returning carrier signal 420 to the numerator of OSNR is small. The power of the carrier signal returning 420 to station A is low because the carrier signal undergoes losses during the round trip from station A to station B, as previously shown in FIG. 4(b). Hence the OSNR at the input-output port 230 of station A 210 for the RTA link system 400 is determined by the lowest signal to highest noise level.

The following sections of this document present RTA systems and techniques to mitigate the effects of Rayleigh backscattering. The OSNR in EQ. 4 can be increased, on one hand, by increasing the power of the detected carrier signal in the numerator, on the other hand, by decreasing the power of the detected Rayleigh backscattering noise in the numerator. A first approach includes amplifying the carrier signal at various locations along the transmission line to counter the large propagation loss without simultaneously amplifying the Rayleigh (see FIG. 4(b)). A second approach includes finding RTA link configurations for which the power level of the transmitted signal is small at locations where the Rayleigh backscattering noise can be generated (see EQ. 3).

Figure 5A:
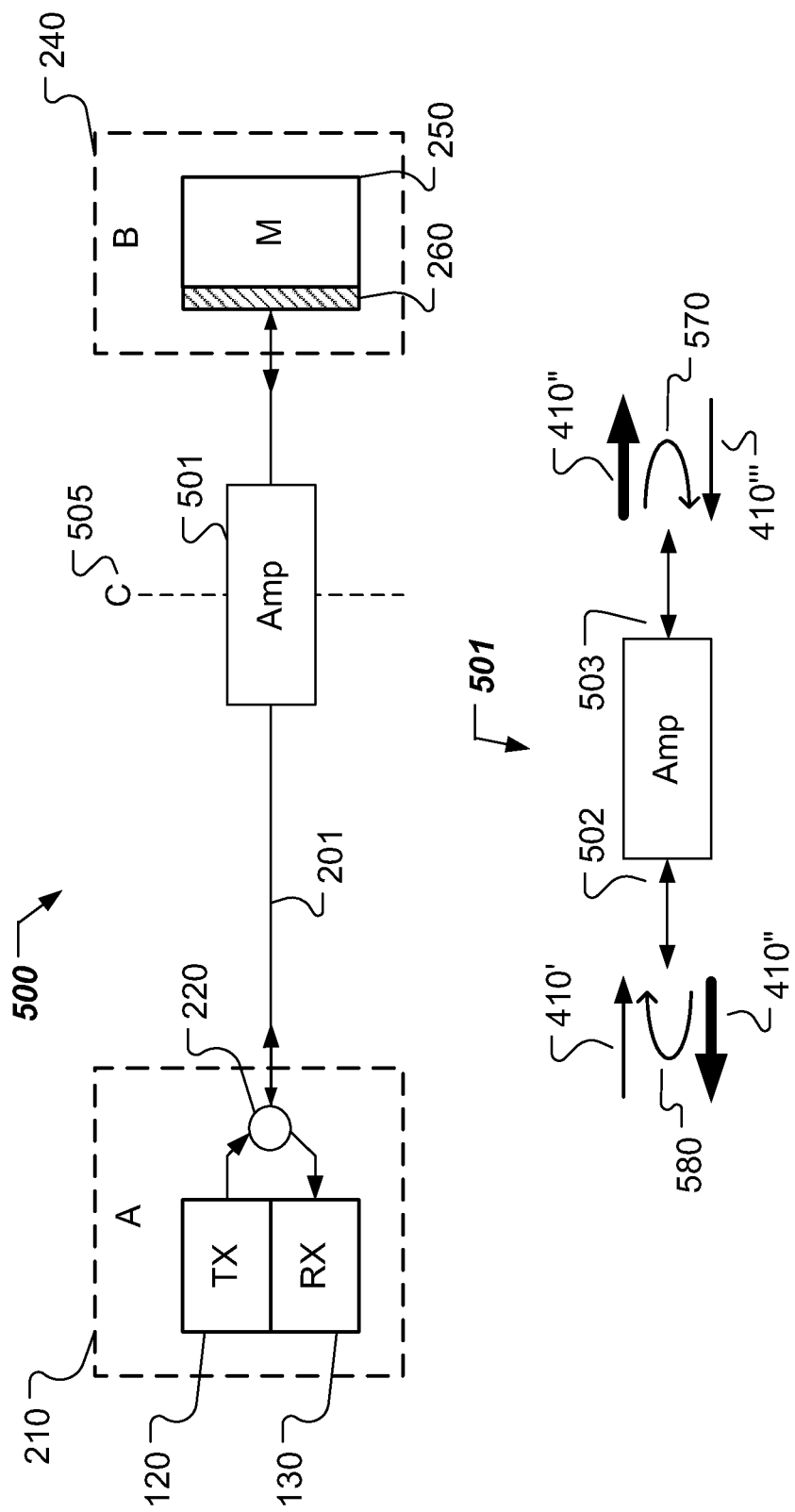
FIG. 5(a) shows a schematic of transmission in an RTA link system with integrated amplification.

FIG. 5(a) illustrates an RTA link system 500 including the components of RTA link systems 200 or 400. Additionally, the RTA link system 500 includes an optical amplifier 501 connected at point C 505 on the transmission line 201, at a distance $D_C=\alpha D$ from station A 210. The optical amplifier can be, for example, an Erbium-doped fiber amplifier (EDFA) configured to gain bidirectionally, but where the gain in each direction is independent of the other direction. Later in this document, an EDFA is also referred to as a discrete amplifier because optical amplification (pumping) occurs in the vicinity of point C 505. Additionally, the optical amplifier can be, for example, a Raman amplifier. Later in this document, the Raman amplifier is also referred to as a distributed amplifier because optical amplification (pumping) occurs over a long fiber optic span centered on point C 505.

On one hand, an optical amplifier recovers the carrier signal power, but on the other hand, the optical amplifier also constitutes a source of Rayleigh backscattering noise. The Rayleigh backscattering noise can be further amplified by passing back through the optical amplifier, as illustrated schematically in the inset 501 of FIG. 5(a). The power level 410' of the carrier signal arriving from station A 210 at the optical amplifier 501 is amplified to a power level 410" by the optical amplifier 501. The amplification factor in the forward direction (with respect to station A 210) of the optical amplifier 501 is, by definition, $G_F>1$. At the same time a Rayleigh backscattering noise 570 is generated at the output 503. The power level 410''' of the carrier signal arriving at the input 503 of the optical amplifier 501 after reflection by station B 240 is amplified to a power level 410''''. The amplification factor in the reverse direction (with respect to station A 210) of the optical amplifier 501 is, by definition, $G_R>1$. The amplification factors may be identical, $G_R=G_F$ (symmetric amplification), or different, $G_R \neq G_F$ (asymmetric amplification). At the same time a Rayleigh backscattering noise 580 is generated at the output 502.

Figure 5B:
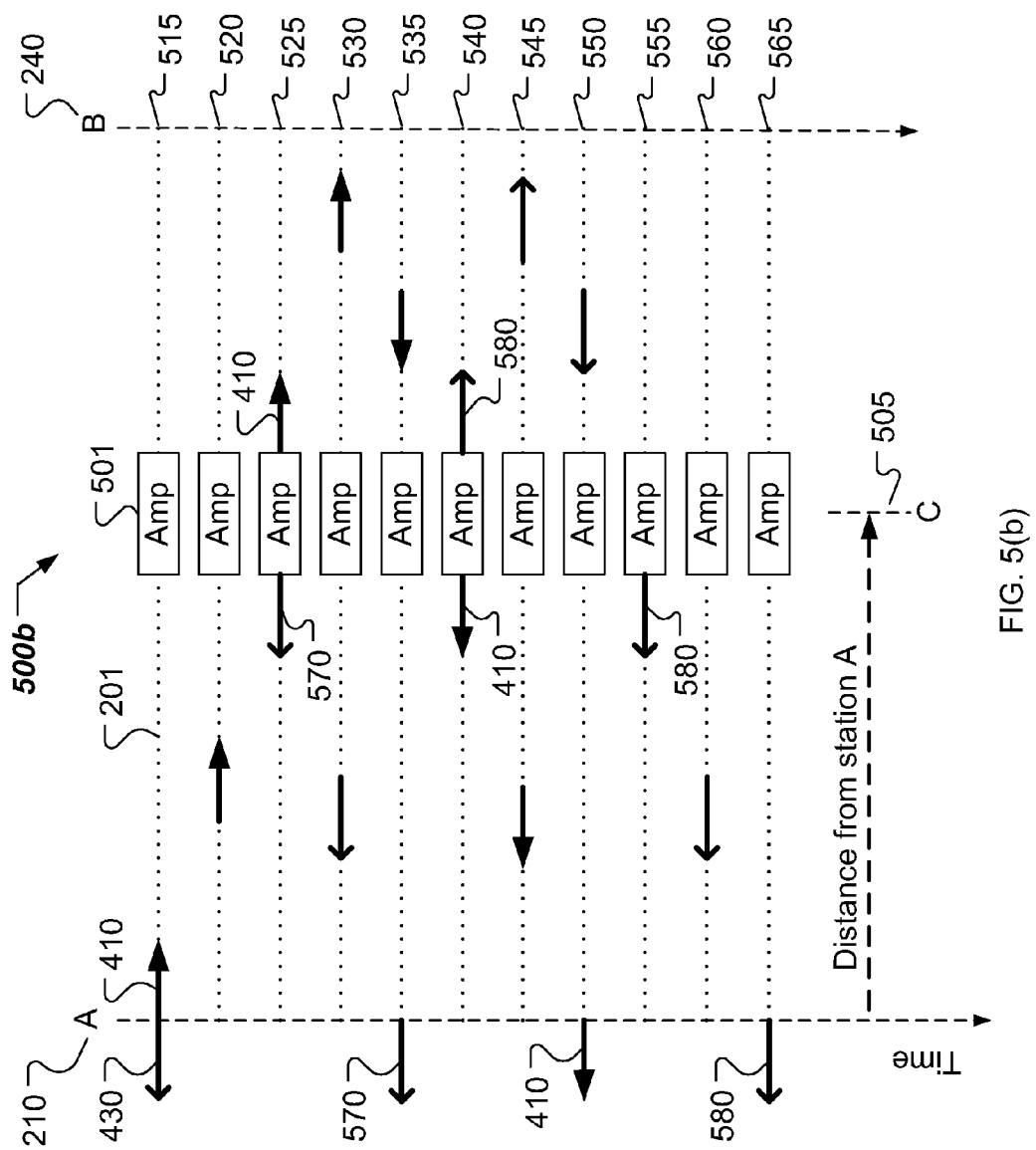
FIG. 5(b) shows transmission of a carrier signal and generation of Rayleigh backscattering noise in an RTA link system with integrated amplification.

FIG. 5(b) illustrates the origin and the effect of Rayleigh backscattering noise generated by the optical amplifier 501, located at point C 505, on the OSNR calculated at the input-output 230 of station A 210. A swim-lane diagram 500b is presented in FIG. 5(b). The location of station A 210 is represented as the left lane of diagram 500b. The location of station B 240 is represented as the right lane of diagram 500b. The center lane of diagram 500b corresponds to the transmission line 201. The optical amplifier 501 coupled to the optical transmission line 201 at location C 505 is part of the center lane of diagram 500b. The time axis of diagram 500b is oriented from top to bottom. Thus, each horizontal level of diagram 500b represents a time instance (time slice) of a transmission process.

At time 515 a wavefront 410 of the carrier signal departs from station A 210. At the same time a Rayleigh backscattering noise 430 is generated at the input of station A 210 (as shown previously in FIG. 4). The Rayleigh backscattering noise 430 is the first and most significant noise contribution to the denominator of the OSNR:

$$<I_A> = S_R I_0 \quad (5)$$

Returning to diagram 500b, at time 520, the wavefront 410 propagates from station A 210 to the optical amplifier 501.

At time 525 the wavefront 410 is amplified by passing through the optical amplifier 501. At the same time a Rayleigh backscattering noise 570 is generated at the optical amplifier 501.

At time 530 the wavefront 410 propagates from the optical amplifier 501 to station B 240, while the Rayleigh backscattering noise 570 propagates from the optical amplifier 501 to station A 210.

At time 535 the wavefront 410 propagates back to the optical amplifier 501 after reflection by station B 240. At the same time the Rayleigh backscattering noise 570 reaches station A 210 and adds a second noise contribution to the denominator of the OSNR:

$$<I'_C> = S_R I_0 L^{2\alpha} G_F G_R \quad (6)$$

The first factor $L^\alpha$ corresponds to losses that the wavefront 410 incurs from station A 210 to point C 505. The factor $G_F$ corresponds to amplification of the wavefront 410 as it passes through the optical amplifier 501. The factor $G_R$ corresponds to amplification of the Rayleigh backscattering noise 570 as it passes back through the optical amplifier 501. The second factor $L^\alpha$ corresponds to losses that the returning Rayleigh backscattering noise 570 incurs from point C 505 to station A 210.

At time 540 the wavefront 410 is amplified by passing through the optical amplifier 501 after reflection by station B 240. At the same time a Rayleigh backscattering noise 580 is generated at the optical amplifier 501.

At time 545 the wavefront 410 propagates from the optical amplifier 501 back to station A 210, while the Rayleigh backscattering noise 580 propagates from the optical amplifier 501 to station B 240.

At time 550 the wavefront 410 reaches station A 210 and contributes to the signal in the numerator of the OSNR:

$$<I_S> = I_0 L^2 G_F G_R \mu \quad (7)$$

The modulation amplitude duty cycle fraction $\mu$ corresponds to the reflection of the wavefront 410 by the station B 240. The factor $L^2$ corresponds to losses that the wavefront 410 incurs during the round-trip from station A 210 to station B 240. The factor $G_F$ corresponds to amplification of the wavefront 410 as it passes through the optical amplifier 501 on the way to station B 240 from station A 210. The factor $G_R$ corresponds to amplification of the wavefront 410 as it passes back through the optical amplifier 501 on way to station A 210 from station B 240. Moreover, the amplifier can be operated such that the link is transparent, i.e., the amplification balances the losses, $G_F G_R L^2 = 1$, and the power level is maintained (on the average) constant through the link. The transparent link is applicable to a "through" link, and would not be optimum for a single link. Returning to diagram 500b, at time 550 the Rayleigh backscattering noise 580 propagates back to the optical amplifier 501 after reflection by station B 240.

At time 555 the Rayleigh backscattering noise 580 is amplified by passing through the optical amplifier 501 after reflection by station B 240.

At time 560 the Rayleigh backscattering noise 580 propagates from the optical amplifier 501 back to station A 210.

At time 565 the Rayleigh backscattering noise 580 reaches station A 210 and adds a third noise contribution in the denominator of the OSNR:

$$<I''_C> = S_R I_0 L^{4-2\alpha} (G_F G_R)^2 \mu^2 \quad (8)$$

The first product $\mu G_F G_R L^{2-\alpha}$ corresponds to amplification and losses that the wavefront 410 incurs from station A 210 to station B 240 and back to point C 505. The second product $\mu G_F G_R L^{2-\alpha}$ corresponds to amplification and losses that the Rayleigh backscattering noise 580 incurs from point C 505 to station B 240 and back to station A 210.

The OSNR for carrier signal reception at station A 210 can be calculated in accordance to EQ. 4 by using the results captured by EQs 5-8:

$$OSNR = \frac{\langle I_S \rangle}{\langle I_N \rangle} = \frac{\langle I_S \rangle}{\langle I_A \rangle + \langle I'_C \rangle + \langle I''_C \rangle} \quad (9)$$

$$OSNR(\alpha) = \frac{\langle I_S \rangle}{\langle I_N \rangle}$$

$$= \frac{I_0 L^2 G_F G_R \mu}{S_R I_0 + S_R I_0 L^{2\alpha} G_F G_R + S_R I_0 L^{4-2\alpha} (G_F G_R)^2 \mu^2}$$

$$OSNR(\alpha) = \left[\frac{L^2}{S_R}\right] 1 + L^{2\alpha} G_F G_R + L^{4-2\alpha} (G_F G_R)^2 \mu^2$$

The numerator of the OSNR in EQ. 9 represents the power of the carrier signal 410 returning to station A 210 after reflection at station B 240. The carrier signal is amplified twice by the optical amplifier 501 during the round trip from station A 210 to station B 240. The denominator of the OSNR in EQ. 9 represents the sum of three contributions of Rayleigh backscattering noise 430, 570 and 580. As discussed above with respect to the inset 501 of FIG. 5(a) and the diagram 500b of FIG. 5(b), there are contributions to Rayleigh backscattering noise from the source at station A 210, and from every point in the system, but particularly where the power is re-amplified. An example of one such point is C 505, where the optical amplifier 501 is coupled on the transmission line.

Figure 5C:
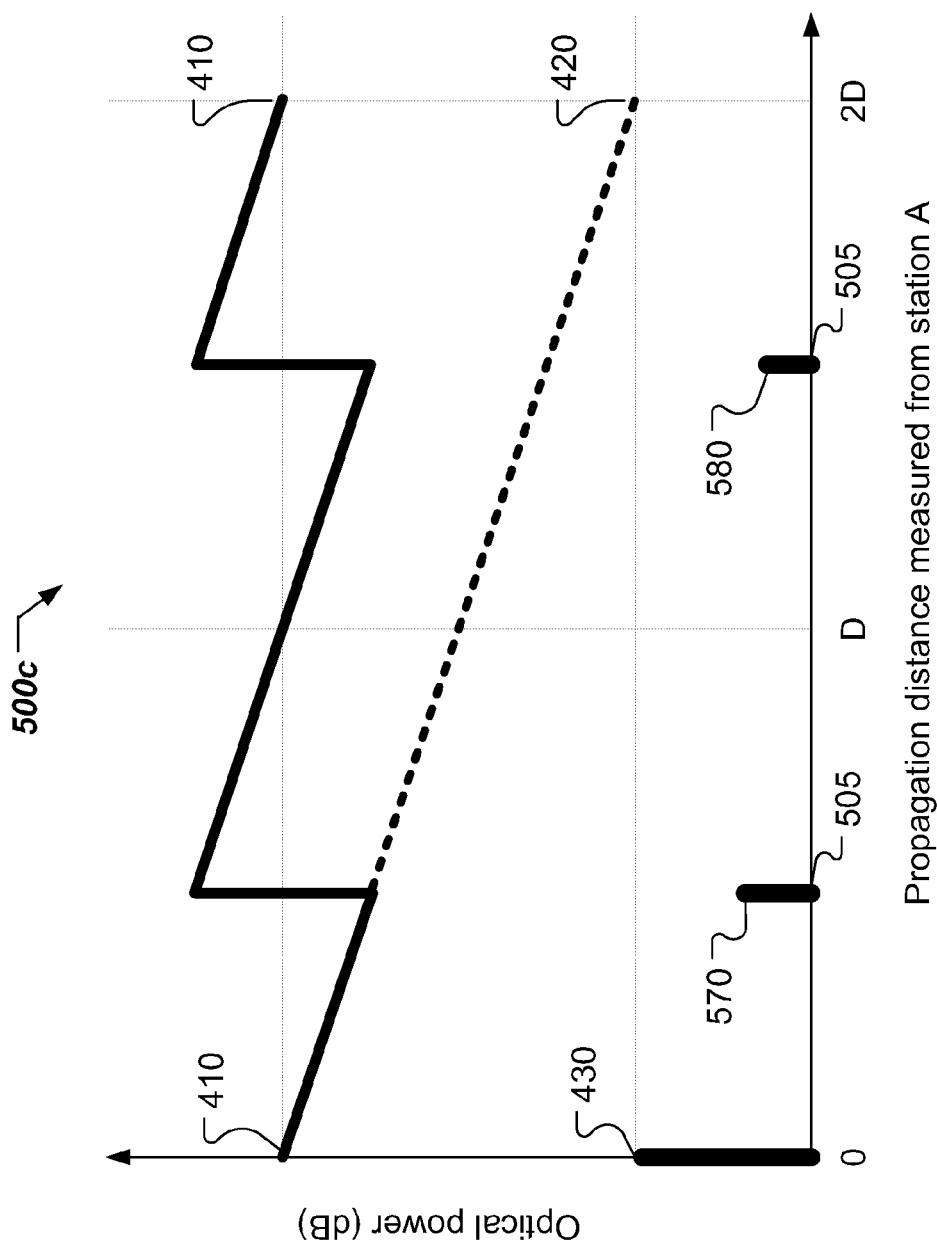
FIG. 5(c) shows optical power of the carrier signal and Rayleigh backscattering noise vs. propagation distance in an RTA link system with integrated amplification.

FIG. 5(c) summarizes the operation principle of the RTA link system 500 in constant gain mode. The composite line-and-bar graph in FIG. 5(c) represents the optical power in the RTA link system 500 of the carrier signal (continuous line) and the Rayleigh backscattering noise (bars) versus the propagation distance (l). The original optical power 410 of the carrier signal emitted by station A 210 is maintained on the average due to amplification provided by the optical amplifier 501, placed at point C 505, between station A 210 and station B 240. Therefore, the power level 410 of the carrier signal returning to station A 210 coincides to the original emission level.

The continuous line in FIG. 5(c) represents the optical power of the carrier signal. The first discontinuity at location 505 corresponds to the increase in power when the carrier signal passes through the optical amplifier during transmission from station A 210 to station B 240. The second discontinuity at location 505 corresponds to the increase in power when the carrier signal passes again through the optical amplifier, after reflection by station B 240, on the return trip to station A 210. Note that the power level of the carrier signal is maintained on the average at a level 410. In contrast, the power level 410 of the carrier signal in the RTA link system 400, illustrated in FIG. 4(b) in FIG. 5(c) by the dashed line, drops to a level 420 after the round trip from station A 210 to station B 240.

Returning to FIG. 5(c), the power of the Rayleigh backscattering noise detected at the input-output port 230 of station A 210 is depicted by three vertical bars placed, for illustrative purpose, at the location on the transmission line where the respective Rayleigh backscattering noise contributions 430, 570 and 580 have been generated. The height of the bars is proportional to the power of the Rayleigh backscattering noise contributions. Notably, the power level of the Rayleigh backscattering noise contributions is given by $G_F S_R$, respectively $G_R S_R$. Moreover, as illustrated in FIG. 5(c) the power level 410 of the carrier signal returning to station A 210 can be maintained constant (on the average), while the sum of the Rayleigh backscattering noise contributions 430, 570, 580 remains small. By further optimizing the location of the optical amplifier 501 (position of point C 505), the relative contributions of the Rayleigh backscattering noise contributions 570 and 580 can be modified as shown in the next section. The optimum placement of the optical amplifier in the RTA link system 500 can be obtained by maximizing the OSNR at station A 210, according to EQ. 9.

Also note, that in order to maintain the power of the carrier signal at an average level 410, during the amplification step the signal power may be raised at levels higher than the starting point power. Depending on the actual power level reached during the amplification process non-linear degradations may be induced. Nonlinear effects can be avoided by using constant (output) power mode, as described later next.

Figure 6A:
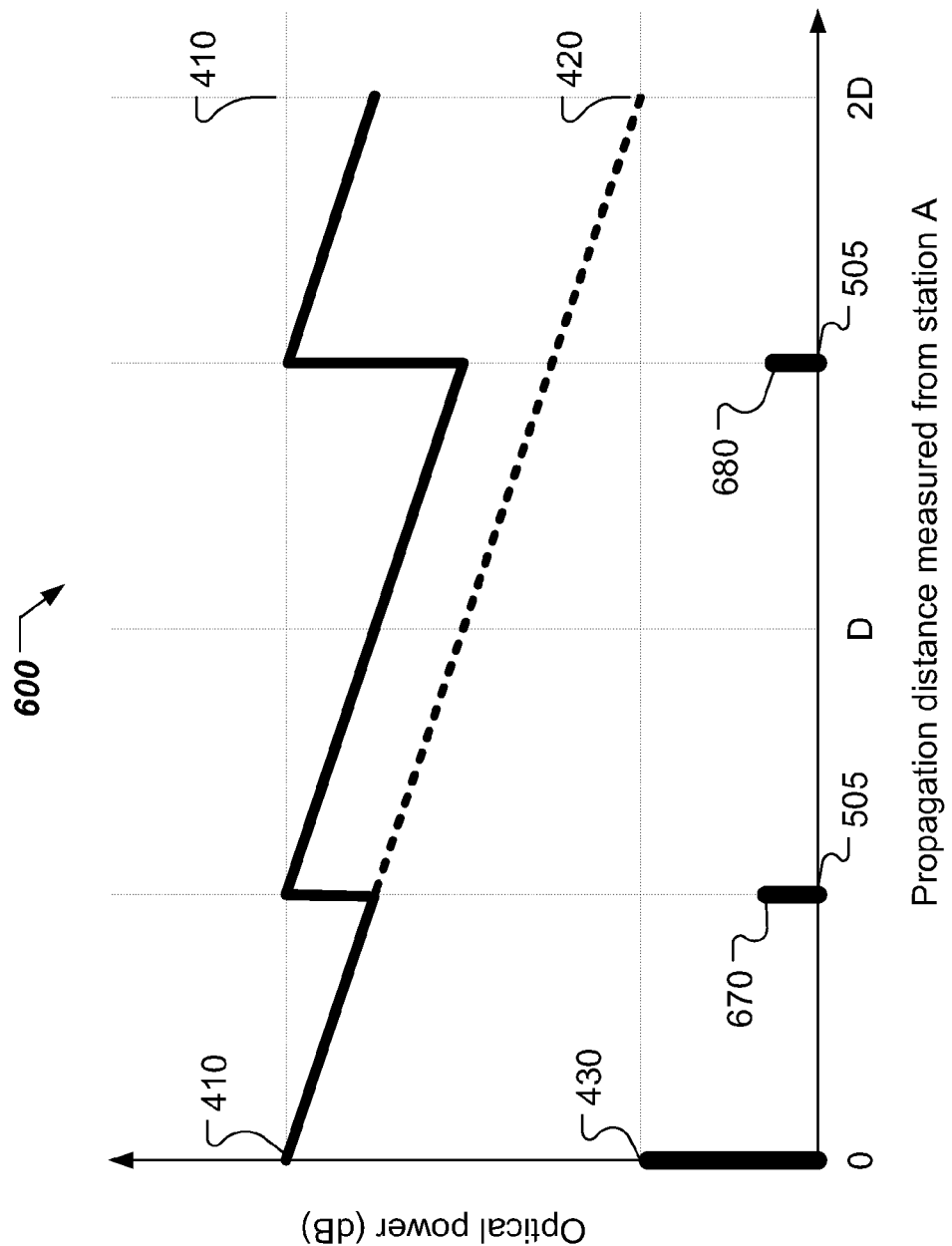
FIG. 6(a) shows optical power of the carrier signal and Rayleigh backscattering noise vs. propagation distance in another RTA link system with integrated amplification.
Figure 6B:
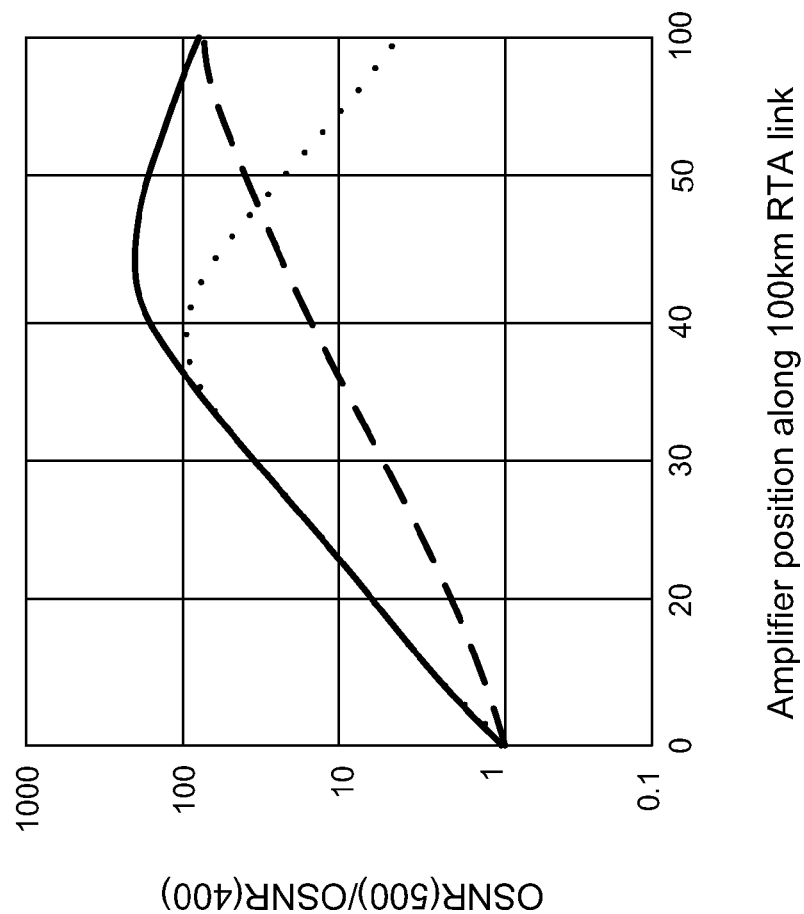
FIG. 6(b) shows improvement in the OSNR of RTA link systems with integrated amplification versus RTA link systems operated without amplification.

FIG. 6(a) summarizes the operation principle of the RTA link system 500 in constant power mode. The composite line-and-bar graph in FIG. 6(b) represents the optical power in the RTA link system 500 of the carrier signal (continuous line) and the Rayleigh backscattering noise (bars) versus the propagation distance (l). A power level close to the original optical power 410 of the carrier signal emitted by station A 210 is maintained (on the average) due to amplification provided by the optical amplifier 501, placed at point C 505, between station A 210 and station B 240. Furthermore, the amplification factor $G_F$ is chosen such that the amplified carrier signal reaches no more than the original power level 410. Also, the amplification factor $G_R$ is chosen such that the amplified carrier signal reaches no more than the original power level 410. As illustrated in FIG. 6(b), the constant power mode corresponds to $G_R > G_F$. The Rayleigh backscattering noise contributions 670 and 680 (in constant power mode) are respectively smaller than the corresponding Rayleigh backscattering noise contributions 570 and 580 (in constant gain mode) illustrated in FIG. 5(c).

In an exemplary implementation of RTA link system 500, placing an optical amplifier 501 operated in constant power mode near station B 240 causes the OSNR (according to EQs. 1-4) to improve from $L^2/S_R$ to $L/S_R$, approximately. For a 100 km link with loss of 0.2 dB/km this gives approximately a 20 dB improvement in OSNR.

In summary, constant power mode means that any optical amplifier 501 only compensates the loss of the fiber section immediately preceding the optical amplifier 501 and hence always restores the power to the original launch power 410 at station A 210. Constant gain mode means the optical amplifier 501 is operated with a fixed gain, usually with the intention of returning the optical signal level measured at the RX 130 back to the launch level 410. The later effectively compensates all the loss of the link, whereas constant power leaves the loss of the last segment of fiber length uncompensated.

FIG. 6(b) shows the OSNR of the RTA link system 500 (with amplification) normalized to the of the OSNR of the RTA link system 400 (without amplification) vs. amplifier position along a 100 km link, according to EQ. 9. As presented above, the position of point C in terms of the distance from D from station A 210 to station B 240 is given by $D_C = \alpha D$. The fraction a represents the dependent variable in EQ. 9. FIG. 6(b) shows that the OSNR of the RTA link system 500 (with amplification) can be two orders of magnitude larger than the OSNR of the RTA link system 400 (without amplification).

Moreover, various relative ratios of the amplification factors GF, GR>1 are being considered in FIG. 6(b). The dashed line represents the OSNR of the RTA link 500 for $1 < G_R \ll G_F$ (unidirectional-forward amplifier). Note that for this amplification scheme the maximum OSNR is obtained when the amplifier 501 is placed near station B 240. The continuous line represents the OSNR of the RTA link 500 for $G_F = G_R$ (bidirectional amplifier). This amplification scheme corresponds, for example, to the constant gain mode illustrated in FIG. 5(c). Note that for this amplification mode the maximum OSNR is obtained when the amplifier 501 is placed near the center of the link between station A 210 and station B 240. The dotted line represents the OSNR of the RTA link system 500 for $1 < G_F \ll G_R$ (unidirectional-reverse amplifier). This amplification scheme corresponds, for example, to a constant power mode and discussed above with regard to FIG. 6(a). Note that for this amplification mode the maximum OSNR is obtained when the amplifier 501 is placed between the center of the link and station B 240.

The results illustrated in FIG. 6(b) only consider Rayleigh backscatter and do not include non-linear degradations that may degrade performance in constant gain mode. Additionally, FIG. 6(b) shows that the maximum OSNR arises when the optical amplifier 501 is placed a certain distance away from B, if $G_R>1$, i.e., an optical amplifier 501 which has a component amplifying in the return direction. Amplification only in the forward direction causes OSNR to increase monotonically, without attaining an optimum (maximum) OSNR. Furthermore, from a practical standpoint, by placing the optical amplifier at an optimum position would also require adding a new but to place the optical amplifier 501 into. The link ends, by definition, already contain amplifier 'huts', hence an exemplary implementation includes placing the amplifiers at the end of the link, for example, in the case of RTA link system 500, the optical amplifier 501 can be placed at station B 240.

The OSNR at station A 210 of the RTA link system 500 can be maintained large by coupling an amplifier 501 to the transmission line 201, as illustrated in FIG. 5(c) or FIG. 6(b). The large OSNR is based on the principle that the resulting Rayleigh backscattering noise contributions are additive (in the denominator), while the signal improvements from amplification are multiplicative (in the numerator). This principle can be applied to RTA link systems to obtain long haul transmission when several optical amplifiers are coupled in series along the transmission line 201. The amplification contribution from each optical amplifier is multiplicative, while the Rayleigh backscattering noise contributions are additive. The techniques and systems discussed below allow to concatenate many segments of optical transmission line. Each segment contains an optical amplifier and can be, at least on average, transparent, namely the carrier signal gain compensates the propagation loss within each segment.

Figure 7A:
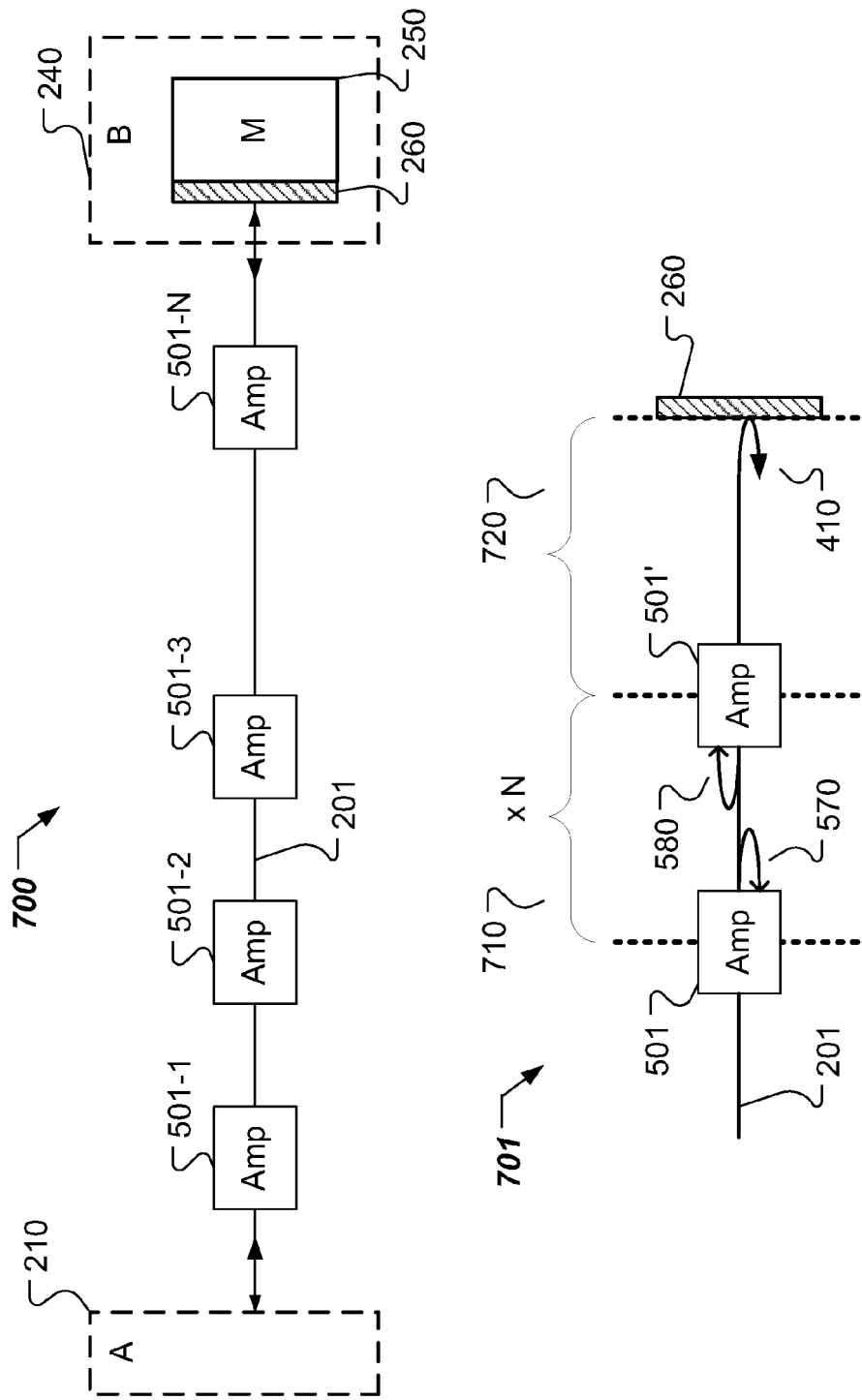
FIG. 7(a) shows a schematic of transmission in a long haul RTA link system with integrated amplification.

An exemplary implementation of such a long haul RTA link system is illustrated in FIG. 7(a). The long haul RTA link system 700 includes station A 210 and station B 240. The long haul RTA link system 700 includes a set of N optical amplifiers 501-1, 501-2, . . . , 501-N coupled sequentially to the transmission line 201. A bidirectional optical amplifier ($G_F>1$ and $G_R>1$) is placed at the intersection of each segment. The distance from station A 210 to station B 240 is D, therefore the length d of each segment of optical transmission line is d=D/(N+1). As discussed above, since the Rayleigh backscattering noise is only additive the OSNR is given by $L/NS_R$. Hence, if the OSNR of $L/S_R$, corresponding to the power mode operation of an RTA link, provides the long haul RTA link system 700 with enough margin, then multiple sections can be concatenated to extend the reach of the long haul RTA link system 700 until the margin is consumed.

As shown in the inset 701 of FIG. 7(a), the long haul RTA link system 700 can be represented by N identical segments 710 plus a segment 720 of optical transmission line near station B 240. This representation of the RTA link system 700 renders symmetry to the long haul transmission model and simplifies future calculations, as exemplified in the next section. This symmetry is important because each intermediate segment 701-j simply provides optical transparency, or at least an approximate average optical transparency across the sum of the intermediate segments. In practice, the condition of transparency insures that no accumulation of loss or gain renders the long haul RTA link system 700 inoperable. The only segment that may present a net loss is the last segment 720 before station B 240.

In order to insure boundary conditions which allow for Rayleigh backscattering and double backscattering, each of the N segments 710 of optical transmission is defined to include an output 503 of an optical amplifier 501, an input 502' of the adjacent optical amplifier 501', and the portion of optical transmission line 201 between the adjacent optical amplifiers 501 and 501'. As discussed above regarding FIGS. 5(a)-(b), there is a Rayleigh backscattering noise contribution 570 from the output 503 of the optical amplifier 501, and a Rayleigh backscattering noise contribution 580 from the input 503' of the optical amplifier 501'. The Rayleigh backscattering noise contributions 570 and 580 from each of the N segments 710 of optical transmission contribute additively to the denominator of the OSNR calculated at station A 210 of the long haul RTA link system 700.

Returning to the inset 701 of FIG. 7(a), the last segment 720 of optical transmission is defined to include the output 503-N of the last optical amplifier 501-N, the reflector 260 of station B 240 and the portion of optical transmission line 201 between the optical amplifier 501-N and station B 240.

Figure 7B:
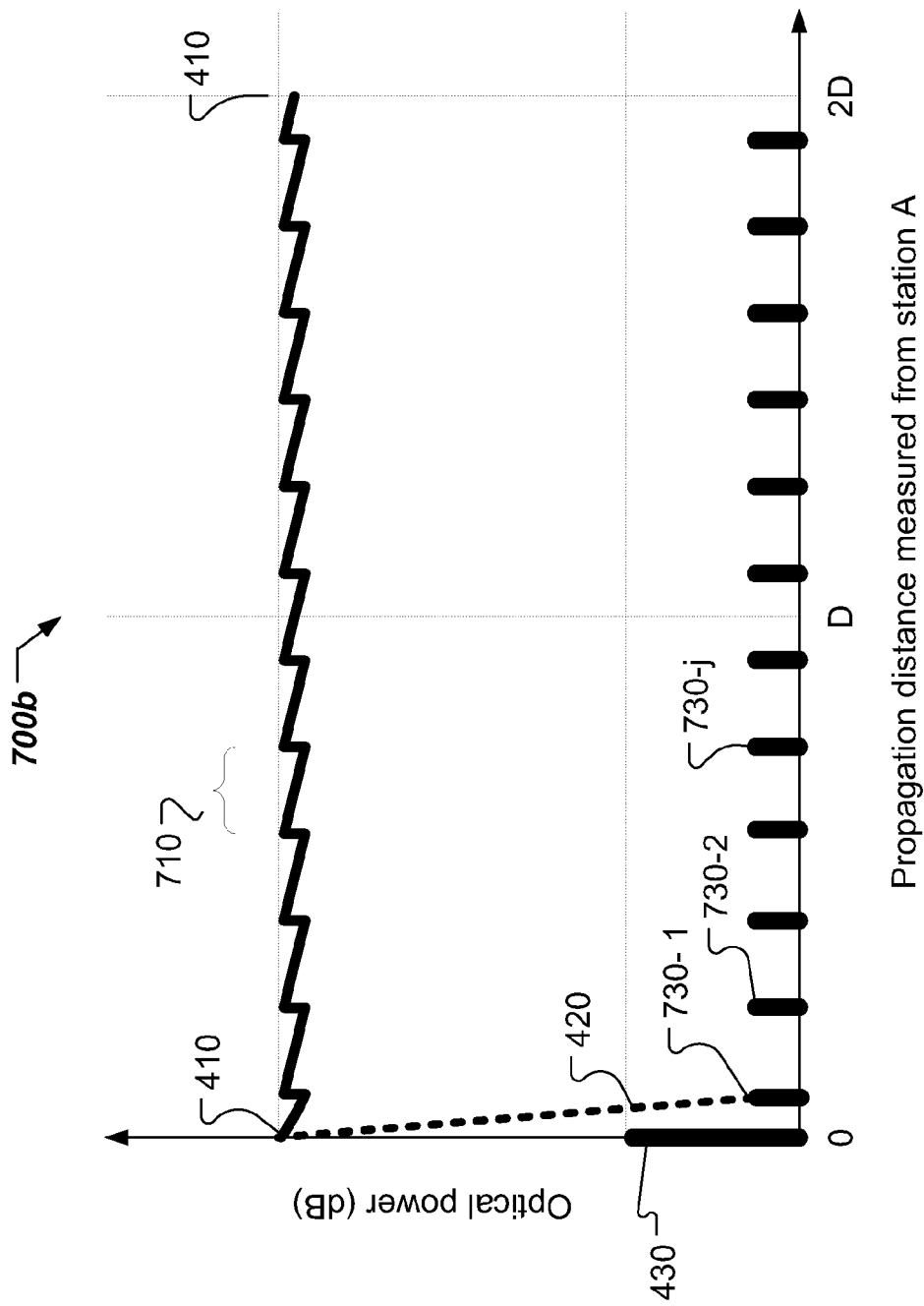
FIG. 7(b) shows optical power of the carrier signal and Rayleigh backscattering noise vs. propagation distance in a long haul RTA link system with integrated amplification.

FIG. 7(b) summarizes the operation principle of the long haul RTA link system 700 in constant power mode. The composite line-and-bar graph in FIG. 7(b) represents the optical power in the RTA link system 700 of the carrier signal (continuous line) and the Rayleigh backscattering noise (bars) versus the propagation distance (1). The original optical power 410 of the carrier signal emitted by station A 210 is maintained on the average through amplification provided in each of the N segments 710 of optical transmission. In contrast, the initial optical power 410 in an RTA link system 400 without amplification (dashed line) drops off very fast to a power level 420 close to zero.

Additionally, the power of the Rayleigh backscattering noise detected at the input-output port 230 of station A 210 is depicted by vertical bars placed, for illustrative purpose, at the location on the transmission line where the respective Rayleigh backscattering noise contributions are generated. The first bar 430 corresponds to the Rayleigh backscattering noise generated at station A 210. The next 2N bars 730-j correspond, respectively, to Rayleigh backscattering noise of type 570 and 580 from each of the N segments 710 (as shown in inset 701 of FIG. 7(a)). Returning to FIG. 7(b), the height of the bars is proportional to the power of the Rayleigh backscattering noise contributions. As noted earlier, the power level of each of the Rayleigh backscattering noise contributions 570 or 580 is equal to $GS_R$. Therefore, each segment 701-j contributes a Rayleigh backscattering noise bar of height $2GS_R$.

Moreover, as illustrated in FIG. 7(b) the power level 410 of the carrier signal returning to station A 210 can be maintained constant (on the average), while the sum of the Rayleigh backscattering noise contributions 430, 730-j increases as the number of optical amplifiers 501-j increases, to a total of $2NGS_R$. Therefore, for a given total distance between station A 210 and station B 240 there is a maximum number of amplifiers that can be concatenated in the RTA link system 700 to preserve the OSNR at station A 210 above a desired target level. Such target level can be the limiting OSNR that can be handled by error correction algorithms used in optical communication networks. The next section introduces techniques to calculate the number of optical amplifiers 501, or equivalently the length of a segment 710 of transmission line, corresponding to a target OSNR at station A 210 for the long haul RTA link system 700.

Returning to the inset 701 of FIG. 7(a), multiple amplification segments 710 and a reflective segment 720 of optical transmission line are concatenated to represent the long haul RTA link system 700. Transmission matrices $T_{710}$ and $T_{720}$ can be derived for each segment 710 and respectively 720, then the T-matrices are multiplied together to obtain the entire RTA link transmission matrix:

$$T_{tot}=T_{720}(T_{710})^N \qquad (10)$$

The transmission matrices $T_{710}$ incorporate both the gain and the Rayleigh scattering of each element in a manner that allows double Rayleigh scattering to be included when the transmission matrices are concatenated. Moreover the elements of transmission matrix $T_{710}$ depend on the specific type of optical amplifier 501 used in the RTA link system 700. Specifically, two types of amplification are considered in the calculations below, namely, discrete amplification when the optical amplifiers 501 are EDFA, and distributed amplification when the optical amplifiers 501 are Raman amplifiers. Additionally, the matrix elements of transmission matrix $T_{720}$ are chosen such that reflective boundary conditions are satisfied for the end link 720.

The total transmission matrix relates the optical input emitted by station A 210 ($a_1=I_0$) and the optical output ($b_1$) represented by the signal returning to station A 210:

$$\begin{bmatrix} b_2 \\ a_2 \end{bmatrix} = \begin{bmatrix} T_{11} & T_{12} \\ T_{21} & T_{22} \end{bmatrix} \begin{bmatrix} b_1 \\ a_2 \end{bmatrix} \quad (11)$$

The matrix elements $T_{ij}$ correspond to the total transmission matrix $T_{tot}$. Using reflective boundary conditions for the end link 720, $a_2=\mu b_2$, the OSNR at station A 210 for the RTA link system 700 is given by:

$$OSNR = \frac{\mu}{\frac{\mu T_{11} - T_{21}}{T_{22} - \mu T_{12}} - \mu} \quad (12)$$

Figure 8:
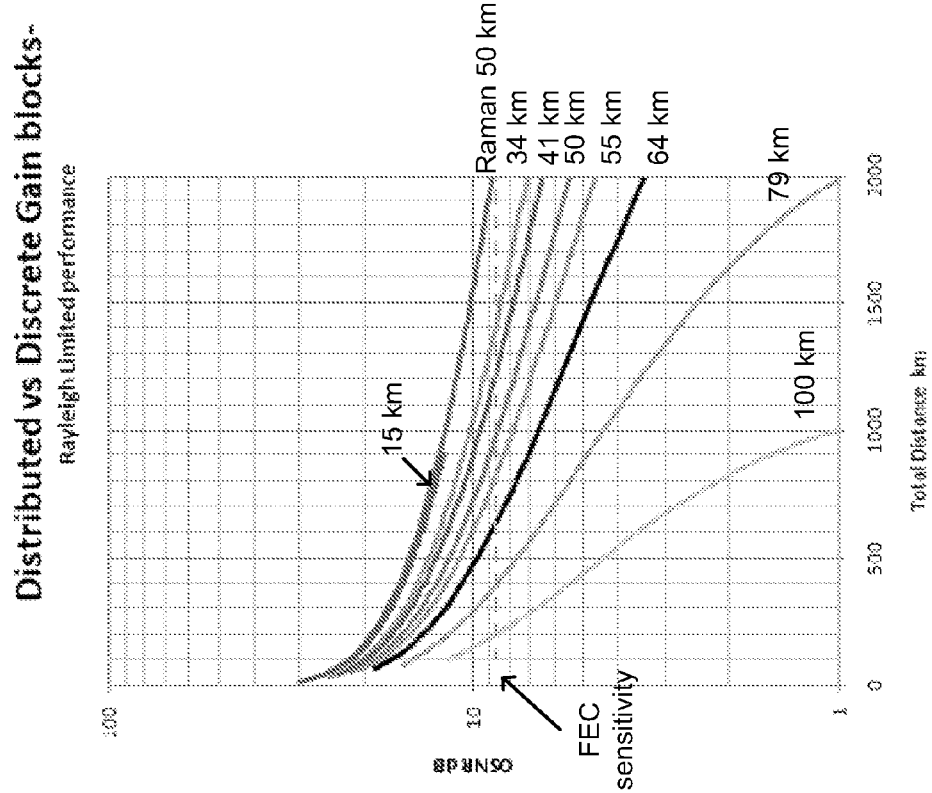
FIG. 8 shows improvement in the OSNR of long haul RTA link systems with integrated amplification with respect to long haul RTA link systems operated without amplification.

FIG. 8 shows the OSNR at station A 210 calculated for a long haul RTA link system 700 where the optical amplifiers 501 are EDFA. The maximum distance between station A 210 and station B 240 is 2000 km. Different optical amplifier 501 spacing ranging from 15 km to 100 km is considered. FIG. 8 also illustrates the OSNR calculated for a long haul RTA link system 700 where the optical amplifiers 501 are Raman amplifiers. In FIG. 8, the length of a distributed amplification segment for Raman amplification is 50 km. FIG. 8 also shows a limit OSNR that may enable error free communication when using forward error correction algorithms.

Based on the results summarized in FIG. 8, RTA links limited by Rayleigh backscattering noise can be as long as 2000 km with appropriate amplifier placement. Moreover, the distributed Raman amplification represents the limiting case of discrete amplifiers (EDFA) placed at very close distances. Thus, while a large number of discrete amplifiers (EDFA) is needed, Raman amplifiers representing the limit of many closely spaced EDFAs provide the same target performance using amplifier spacing of order 50 km, used in other optical fiber link systems. In other words, Raman amplifiers spaced at 50 km give equivalent performance to EDFAs spaced at 15 km. In can be seen that in general performance is enhanced by using large numbers of low gain amps rather than low numbers of high gain amps, with the limiting case being a distributed Raman amplifier.

Although a few variations have been described in detail above, other modifications are possible. In another exemplary implementation of a long haul RTA link system 700 combinations of different amplifier type can be used. In yet another implementation, link segment 701-$i$ can have different transmission properties from every other link segment 701-$j$.

Furthermore, the logic flow depicted in the accompanying figures and described herein do not require the particular order shown, or sequential order, to achieve desirable results.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations, enhancements and other implementations can be made based on what is described and illustrated in this document.

What is claimed is what is described and illustrated, including:

1. A system for optical communications, comprising:
   a first optical communication module to output a first optical signal;
   an optical link optically coupled to the first optical communication module to receive and transmit the first optical signal;
   a second optical communication module optically coupled to the fiber to reflect the first optical signal back into the link towards the first optical communication module as a second optical signal to be received by the first optical communication module; and
   one or more optical amplifiers coupled between the first and second communication modules to amplify the second optical signal to maintain, at least on average, a power level for the second optical signal equal to the power level of the first optical signal, wherein the one or more optical amplifiers include a first optical amplifier coupled at a first location on the optical link, wherein the first location is determined based on maximizing an optical signal to noise ratio (OSNR) computed as the ratio of the power level of the second optical signal to an optical noise power comprising both a first Rayleigh backscattering noise generated at the first optical communication module and a second Rayleigh backscattering noise generated at the first optical amplifier.

2. The system as in claim 1, wherein the one or more optical amplifiers are configured to amplify the first optical signal to maintain, at least on average, a constant power level for the first optical signal.

3. The system as in claim 1, wherein:
   a gain provided by each optical amplifier substantially compensates for a signal loss due to signal propagation to the optical amplifier from the nearest one of:
   the first optical communication module; and
   a previous optical amplifier upstream from the optical amplifier.

4. The system as in claim 1, wherein only one optical amplifier is coupled between the first and second communication modules and a coupling location is adjacent to the second optical communication module.

5. The system as in claim 1, wherein only one optical amplifier is coupled between the first and second communication modules and a coupling location is in the middle between the first optical communication module and the second optical communication module.

6. The system as in claim 1, wherein the one or more optical amplifiers comprise an Erbium-doped fiber amplifier (EDFA) or a Raman amplifier.

7. The system as in claim 1, wherein the one or more optical amplifiers provided discrete amplification or distributed amplification.

8. The system as in claim 1, wherein a type of the one or more optical amplifiers comprises:
bidirectional (GF>1 and GR>1);
unidirectional, comprising forward (GF>1 and GR=1) or reverse (GF=1 and GR>1).

9. The system as in claim 1, wherein:
the second optical communication module comprises an optical modulator that modulates the reflected light in the second optical signal to superimpose information or data onto the second optical signal to transmit the information or data to the first optical communication module.

10. A method comprising:
emitting a carrier signal from a station A;
transmitting the emitted carrier signal to a station B through an optical transmission line;
passing the outbound carrier signal through one or more optical amplifiers integrated in the transmission line;
reflecting the passed carrier signal at station B;
transmitting the reflected carrier signal to station A through the optical transmission line;
amplifying the inbound carrier signal through the one or more optical amplifiers integrated into the transmission line; and
receiving the transmitted carrier signal at station A,
wherein the one or more optical amplifiers are configured to maintain, at least on average, a power level for the inbound carrier signal equal to the power level of the outbound signal, wherein the one or more optical amplifiers include a first optical amplifier coupled at a first location on the optical link, wherein the first location is determined based on maximizing an optical signal to noise ratio (OSNR) computed as the ratio of the power level of the received carrier signal at station A to an optical noise power comprising both a first Rayleigh backscattering noise generated at station A and a second Rayleigh backscattering noise generated at the first optical amplifier.

11. The method as in claim 10, wherein the one or more optical amplifiers are configured to amplify the outbound signal to maintain, at least on average, a constant power level for the outbound signal.

12. The method as in claim 10, wherein:
a gain provided by each optical amplifier substantially compensates for a loss due to carrier signal propagation to the optical amplifier from the nearest one of:
station A; and
a previous optical amplifier upstream from the optical amplifier.

13. The method as in claim 10, wherein only one optical amplifier is coupled between station A and station B and a coupling location is adjacent to station B.

14. The method as in claim 10, wherein only one optical amplifier is coupled between station A and station B and a coupling location is in the middle between station A and station B.

15. The method as in claim 10, wherein only one optical amplifier is coupled between station A and station B, the method further comprises:
placing the optical amplifier at a location on the transmission line to maximize an optical signal to noise ratio (OSNR) at station A, wherein the OSNR is limited by co-propagating noise contributions.

16. The method as in claim 10, wherein the one or more optical amplifiers comprise an Erbium-doped fiber amplifier (EDFA) or a Raman amplifier.

17. The method as in claim 10, wherein the one or more optical amplifiers provide discrete amplification or distributed amplification.

18. The method as in claim 10, wherein a type of the one or more optical amplifiers comprise:
bidirectional (GF>1 and GR>1);
unidirectional, comprising forward (GF>1 and GR=1) or reverse (GF=1 and GR>1).

19. The method as in claim 10, comprising:
modulating a data stream onto the reflected carrier signal at the station B.

20. The method as in claim 19 comprising:
concatenating a set of optical amplifiers on the transmission line to provide at least a minimum optical signal to noise ratio (OSNR) at station A, wherein
the OSNR is limited by co-propagating noise contributions and
the minimum OSNR is based on capability of station A to demodulate the data stream from the reflected carrier signal.

21. The method as in claim 20, wherein the set of optical amplifiers comprises either EDFA or Raman amplifiers.

22. An optical communication system, comprising:
a first optical communication module to output a first optical signal;
a second optical communication module to receive the first optical signal and to generate from the first optical signal a second optical signal for transmission to the first optical communication module;
a single optical link connected between the first and second optical communication modules to guide the first and the second optical signals in the same optical path provided by the single optical link, the same optical path provided by the single optical link exhibiting backward Rayleigh scattering to produce Rayleigh scattering noise in response to signal light in a direction opposite to the signal light at each location along the optical path; and
one or more optical amplifiers located in the single optical link between the first and second optical modules at locations which are selected based on maximizing an optical signal to noise ratio (OSNR), wherein the noise signal in computing the OSNR comprises primarily the Rayleigh scattering noise.

23. The system as in claim 22, wherein:
the second optical module comprises a reflector that reflects light in the first optical signal to produce light in the second optical signal; and
an optical modulator that causes optical modulation in the reflected light in the second optical signal to carry information to be communicated to the first optical module.

24. The system as in claim 22, wherein:
the one or more optical amplifiers collectively to maintain, at different locations in the optical link, an approximately average optical power in the second optical signal equal to an approximately average power level of the first optical signal.

25. The system as in claim 24, wherein:
the one or more optical amplifiers collectively to maintain, on average, a constant power level for the first optical signal.

26. The system as in claim 22, wherein:
the single optical link is a fiber.

* * * * *